E. M. FOWLER.
VALVE FOR DRAINAGE AND IRRIGATING SYSTEMS.
APPLICATION FILED JUNE 3, 1909.
961,292.
Patented June 14, 1910.
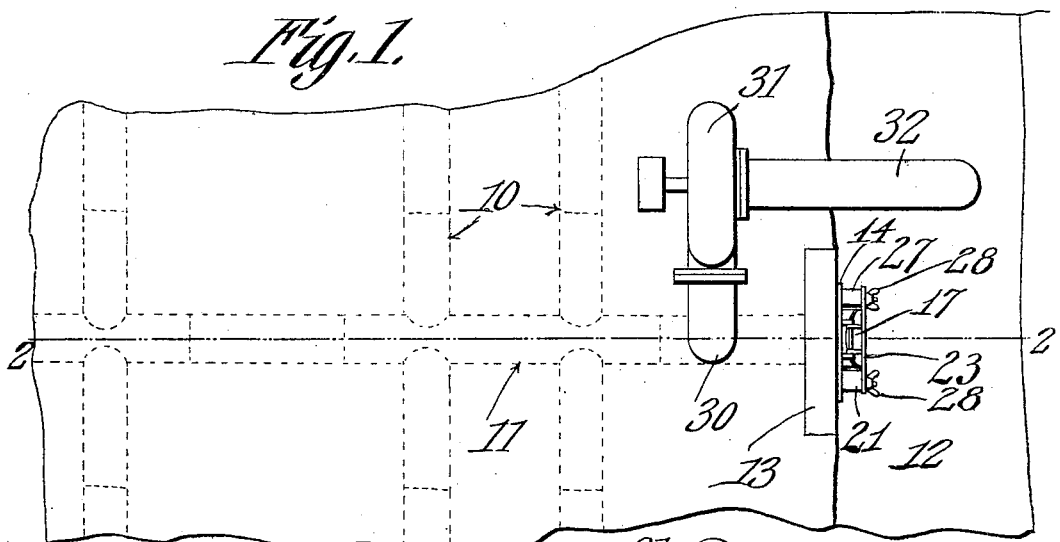
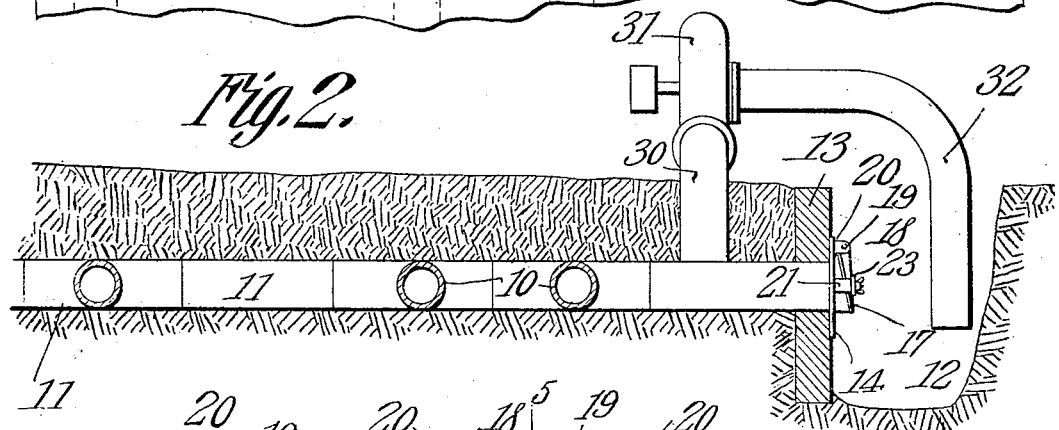
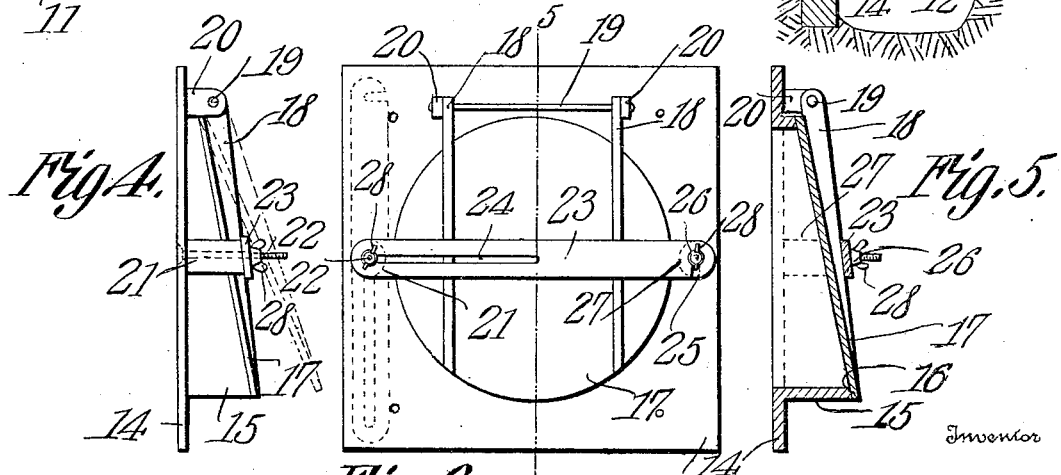
Witnesses
Inventor
Edward M. Fowler.
By C. A. Snow & Co.
Attorneys

UNITED STATES PATENT OFFICE.

EDWARD M. FOWLER, OF ALEXANDRIA, MISSOURI.

VALVE FOR DRAINAGE AND IRRIGATING SYSTEMS.

961,292.  Specification of Letters Patent.  Patented June 14, 1910.

Application filed June 3, 1909. Serial No. 499,887.

*To all whom it may concern:*

Be it known that I, EDWARD M. FOWLER, a citizen of the United States, residing at Alexandria, in the county of Clark and State of Missouri, have invented a new and useful Valve for Drainage and Irrigation Systems, of which the following is a specification.

The invention has for its object to provide a novel form of valve to be used in connection with a drainage and sub-irrigation system, and it consists in a construction and arrangement of parts to be hereinafter described and claimed, reference being had to the drawing hereto annexed in which—

Figure 1 is a diagrammatic plan view of the system showing the application of the invention. Fig. 2 is a section on the line 2—2 of Fig. 1. Fig. 3 is a face view of the valve. Fig. 4 is a side elevation of the valve. Fig. 5 is a section on the line 5—5 of Fig. 3.

In the drawing, 10 denotes several lines of drain tiles which discharge into a main 11, and the latter empties into a ditch 12. At the discharge end of the main is built a headwall 13 through which the main extends. On this headwall is rigidly mounted a plate 14 provided with an opening which is surrounded by an outstanding annular rim 15, the outer edge of which is inclined and forms a seat 16 for a valve 17. The plate 14 is so located with respect to the main 11 that the opening in said plate coincides with the bore of the main, said main extending up to the back of the plate, and being adapted to discharge through the opening in the plate, when the valve 17 is off the seat 16, and thus discharge into the ditch 12. The valve is a circular flap which is hinged by means of knuckles 18 on a rod 19 mounted in ears 20 on the plate 14. To one side of the rim 15 a stud 21 rises from the plate 14, and this stud carries a screw-stem 22 upon which is mounted a bar 23, said bar having adjacent to one of its ends a longitudinal slot 24 through which the stem 22 extends. The opposite end of the bar 23 is formed with a transverse slot 25 adapted to receive a screw-stem 26 carried by a stud 27 similar to the stud 21. The bar 23 is adapted to be extended across the valve 17 when the same is seated, and thus lock the valve to its seat, the studs 21 and 27 being of such a height that the bar may be extended across the valve as stated. The bar is held in this position by means of wing nuts 28 screwed on the stems 22 and 26. To release the valve, the wing nuts are eased, and the bar is swung on the stem 22 a sufficient distance for the slot 25 to clear the stem 26, and the bar is then slid laterally, and swung on the stem 22 so that it extends perpendicularly beside the flange 15 as shown by dotted lines in Fig. 3. The slot 24 permits this movement of the bar, and upon tightening the wing nut 28 the bar will be securely held in the position stated.

Besides locking the valve to its seat, the bar 23 is also adapted to hold the valve partly open which is done by swinging the valve open, and then extending the bar across the valve seat. With the bar in this position the valve is held off its seat as shown by dotted lines in Fig. 4.

At 30 is indicated a stand-pipe communicating with the main 11, and rising above the ground a suitable distance. Into this stand-pipe discharges a pump 31 the suction pipe 32 of which leads to the ditch 12.

The valve hereindescribed in its released position is intended to be used as a back pressure valve for preventing the water in the ditch 12 from flowing back into the main 11. This is especially useful in flat stretches of land where the discharge from the ditch 12 is slow, and where the level thereof is therefore liable to rise to the level of the water in the main. By means of the valve the water in the ditch is prevented from flowing into the main, and when the level in the ditch drops below the level in the main, the valve opens and relieves the main. At any time the valve is not required as a back-pressure valve, and it is desired that it remain partly open in order to allow air to pass through the tile lines the valve is thus held open by extending the bar 23 across its seat, as already described.

The sub-irrigation is effected in the following manner: The valve 17 is locked down on its seat 16 by means of the bar 23 in the manner already described. The water is then pumped from the ditch 12 into the lines of tiles 10 and the main 11 through the standpipe 30. Water is pumped to fill the lines until the water rises in the standpipe to a level coincident with the surface of the land to be irrigated. The pump is then regulated to supply the necessary amount of water to hold the water at this level, and the pumping is continued until the desired amount of water has penetrated the ground through the veins extending from the tile lines. By keeping the water level even with the surface of the ground, the latter is prevented from being submerged. After a sufficient amount of water has been supplied to the land, the bar 23 is released, and swung out of the way of the valve 17 so that the latter may open and permit drainage to again take place. If it is desired to relieve the tile lines of the water gradually, this can be accomplished by fastening the bar 23 across the valve, and loosening the wing nuts 25 and 28 enough to permit part opening of the valve.

The pump may also be employed for discharging water out of the tile lines when the back pressure from the ditch water would not allow the main to discharge.

A pump may also be installed at the opposite end of the tile lines, but in this case the water level must be kept on a level with the surface of the ground at the first-described end of the tile lines, as otherwise there will be a tendency to submerge this part of the land.

What is claimed is:

1. The combination with a valve comprising a hinged flap, and a seat therefor, of a bar pivotally mounted adjacent to the valve seat, and adjustable to extend across the valve seat between the same and the valve in contact with the inner face of the valve to hold the same partly open, and means for locking said bar in said extended position.

2. The combination with a valve comprising a hinged flap, and a seat therefor, of a bar pivotally mounted adjacent to the valve seat, and adjustable to extend across the valve when seated, and also across the seat between the same and the valve in contact with the inner face of the latter for holding the same partly open, and means for locking said bar in said positions.

3. The combination with a valve comprising a plate having an opening, and a flap valve seating on said opening, of a threaded stem carried by the plate, a bar having a longitudinal slot in which the stem is received, said bar being of a length to be extended across the valve, and a nut screwed on said stem.

4. The combination with a valve comprising a plate having an opening, an annular rim surrounding said opening, the edge of which rim forms a valve seat, and a flap valve engaging said seat, of a threaded stem rising from the plate, a bar having a longitudinal slot in which the stem is received, said bar being of a length to be extended across the valve, and a nut screwed on said stem.

In testimony that I claim the foregoing as my own, I have hereto affixed my signature in the presence of two witnesses.

EDWARD M. FOWLER.

Witnesses:
C. P. Forr,
G. W. Hill.